Nov. 23, 1926.                    A. BACHLE                    1,607,600

PEDAL SEAL

Filed Sept. 21, 1925

Inventor
Andrew Bachle
Whittemore Hulbert
Whittemore & Belknap
By
Attorneys

Patented Nov. 23, 1926.

1,607,600

UNITED STATES PATENT OFFICE.

ANDREW BACHLE, OF DETROIT, MICHIGAN.

PEDAL SEAL.

Application filed September 21, 1925. Serial No. 57,696.

The invention relates to motor vehicles and refers more particularly to means for sealing the opening in the floor board through which the control pedals operate.

One of the objects of my invention is to provide a pedal seal which is of simple construction comprising relatively few parts resulting in economical manufacture. A further feature of my invention resides in the provision of a device of the character aforesaid which will, at all times effectively seal the floor board opening and at the same time permit unrestricted operation of the pedals.

With these and other objects in view, the invention resides in the novel features of construction and combination and arrangements of parts as more fully hereinafter described and claimed.

Referring to the accompanying drawings in which like reference characters indicate corresponding parts, Figure 1 is a sectional elevation view through the floor board;

Figure 1:
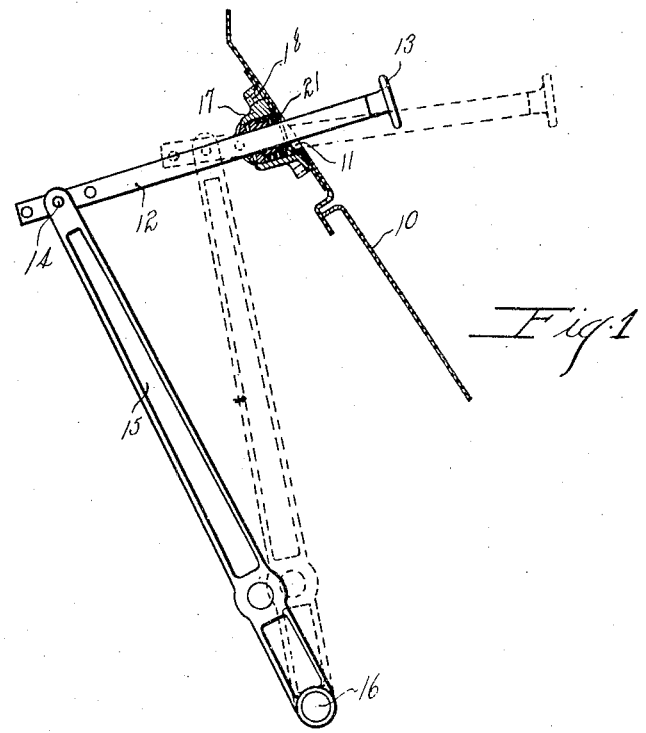
Figure 4:
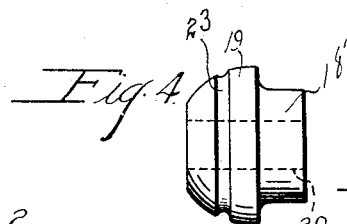
Figure 4 is a plan view in detail showing the ball swivel member.
Figure 2:
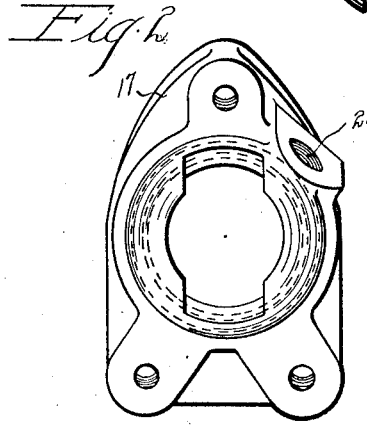
Figure 2 is an end elevation showing in detail the ball socket member.
Figures 3, 5:
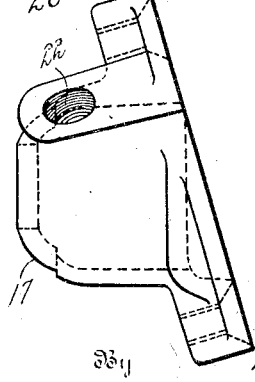
Figure 3 is a side elevation view of the ball socket member.
Figure 5 is a front elevation view of the ball swivel member.

In the drawings reference character 10 represents the usual floor board of a motor vehicle provided with one or more openings 11 through which pass the control members or stems 12 operable by pedals 13. In Figure 1 I have illustrated only one of the control members, although it will readily be understood that my invention is designed to be incorporated with as many control members as may be found on the vehicle. The control member 12 in accordance with common practice may be pivotally connected at 14 with the lever 15, the latter being mounted to rock the shaft 16 so as to effect a controlling movement of the parts of the car such as the clutch, brake, transmission, etc.

For sealing the opening 11 and at the same time accommodating the sliding movement of the central member 12 I have provided a ball socket member 17 preferably secured by suitable fastening members 18 beneath the floor board 10. Within the ball socket member 17 is a ball swivel member 18', the latter having a spherical portion 19 engageable with a like portion of the ball socket member to provide a swivelling movement of the ball swivel member. The latter member is also provided with an axial bore 20 preferably of a rectangular outline conforming with the cross section of the control member 12 whereby the control member may slide with a close fit within the opening 20. 21 is a spring adapted to yieldingly hold the ball swivel against the ball socket.

For lubricating the relatively movable parts I have provided a radial opening 22 in the ball socket member for accommodating an oil cup or other lubricant feeding means, this opening being adapted to register with the peripheral oil groove 23 of the ball swivel 18. Drilled openings 24 provide passage of the lubricant from the groove 23 to the opening 20 for lubricating the sliding surfaces of the control member 12 within the ball swivel 18.

It will be noted that I have provided a pedal seal which is of simple construction and which will effectively seal the floor board opening at the same time permitting ready movement of the control member during its operation.

While it is believed from the foregoing description, the nature and advantage of my invention will be readily understood, I desire to have it understood that I do not limit myself to what is herein shown and described and that such changes may be resorted to when desired as fall within the scope of the claims.

What I claim as my invention is:—

1. The combination with a motor vehicle floor board or the like provided with an opening, of a control member operable through said opening and a sealing device for the opening comprising a member rigidly secured to the floor board adjacent the opening therein and a movable member supported by said rigidly mounted member and provided with an opening for slidably receiving the control member.

2. In combination with a motor vehicle floor board or the like provided with an opening, a control member operable through said opening, and a sealing device for the opening affording a sliding movement of the said control member, said sealing device comprising a member movable to conform to the positions of the control member during movement of the latter, and a member rigidly secured to the floor board adjacent the opening therein, said last mentioned member forming a bearing for said movable member.

3. In combination with a motor vehicle floor board or the like provided with an opening, a control member operable through said opening, and a sealing device for the opening affording a sliding movement of the said control member, said sealing device being in the nature of a ball and socket.

4. In combination with a motor vehicle floor board or the like provided with an opening, a control member operable through said opening, and a sealing device for the opening affording a sliding movement of the said control member, said sealing device comprising a fixed ball socket, a ball swivel operable within the ball socket and provided with an opening adapted to slidably receive the said control member.

5. In combination with a motor vehicle floor board or the like provided with an opening, a pedal stem operable through said opening and a swivel sealing device for the opening and stem.

6. In combination with a motor vehicle floor board or the like provided with an opening, a pedal stem operable through said opening, and a sealing device for the opening and stem, said sealing device comprising a member mounted to swivel with the pedal stem.

7. In combination with a motor vehicle floor board or the like provided with an opening, a lever mounted for rocking movement, a pedal stem operable through said opening and connected to move said lever, and a sealing device for the opening and stem, said sealing device comprising a member mounted to swivel with the pedal stem.

8. In combination with a motor vehicle floor board or the like provided with an opening, a lever mounted for rocking movement, a pedal stem operable through said opening and connected to move said lever, and a sealing device for the opening and stem comprising a ball socket fixed with respect to the floor board, and a ball swivel mounted for swivelling movement within said socket, said ball swivel slidably engaging the pedal stem.

9. In combination with a motor vehicle floor board or the like provided with an opening, a control member operable through said opening and a sealing device for the opening, said sealing device comprising a fixed socket member substantially closing the opening and a movable member within said fixed socket member, said movable member being adapted to slidably receive the control member.

10. The combination with a motor vehicle floor board or the like provided with an opening and a control member operable through said opening of a sealing device for the opening, said sealing device comprising a socket member secured to the floor board adjacent the opening and substantially closing the same, a ball swivel operable within the socket member and adapted to slidably receive the control member and a spring for yieldably holding the ball swivel against the socket member.

In testimony whereof I affix my signature.

ANDREW BACHLE.